Figure 1:
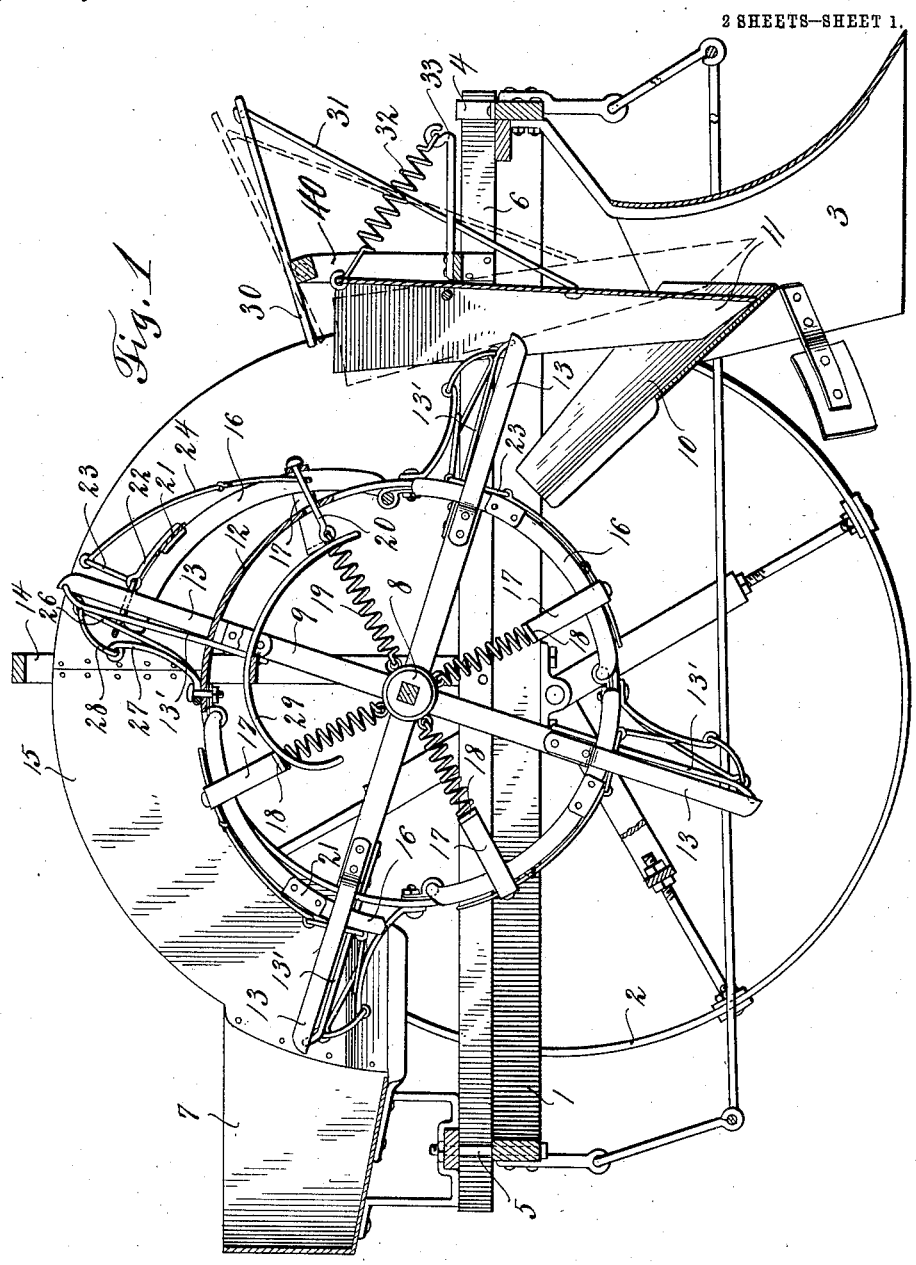

C. HANSEN.
POTATO PLANTER.
APPLICATION FILED FEB. 25, 1911.

1,015,177.

Patented Jan. 16, 1912.

2 SHEETS—SHEET 1.

WITNESSES:
E. Larson
H. W. Brooke

INVENTOR
C. Hansen
BY Beelert Cobb
 J. J. Pott
Attorney

C. HANSEN.
POTATO PLANTER.
APPLICATION FILED FEB. 25, 1911.
1,015,177.
Patented Jan. 16, 1912.
2 SHEETS—SHEET 2.
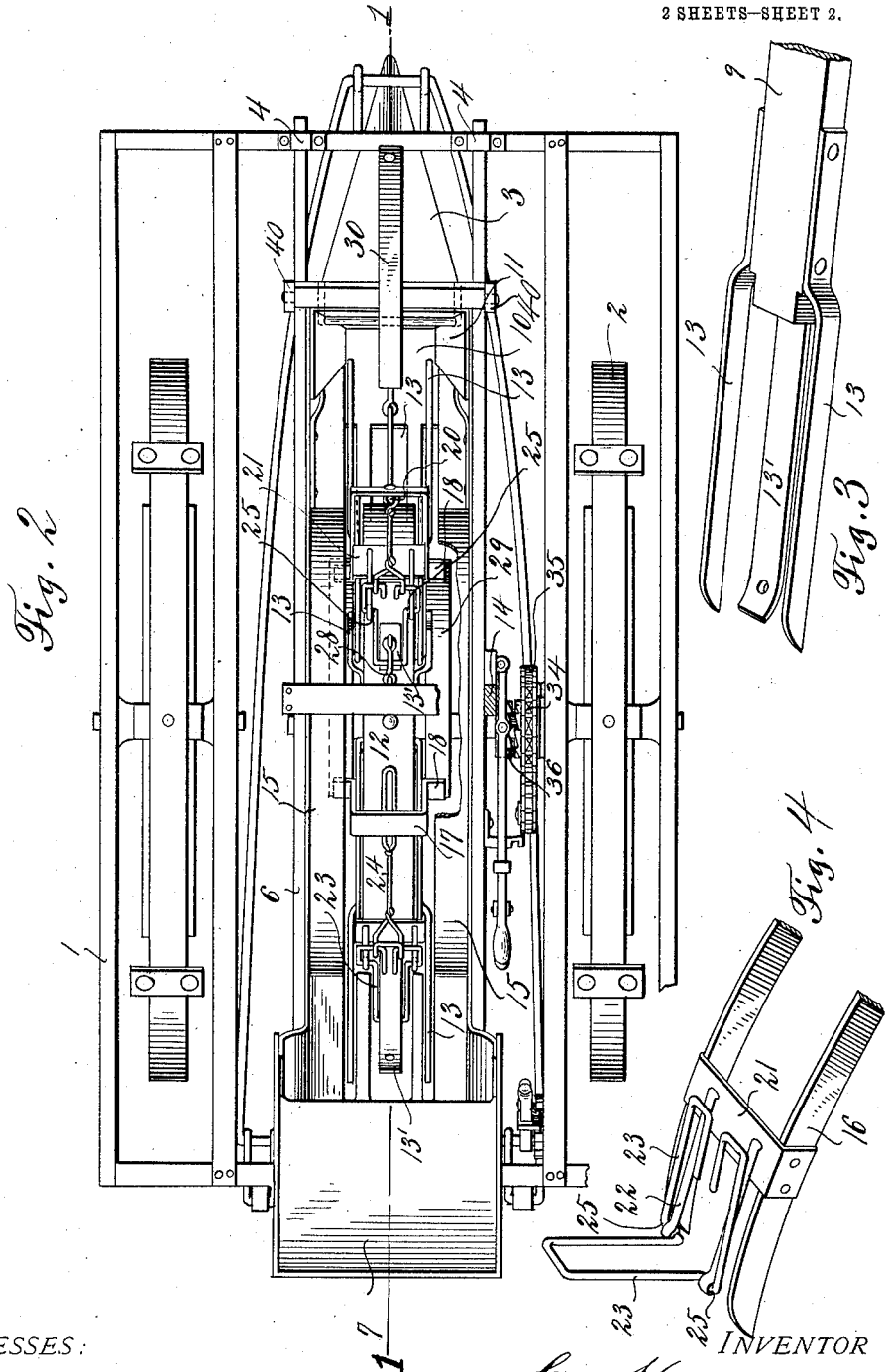
WITNESSES:
E Larson
H. M. Brooks
INVENTOR
C. Hansen
BY Beeler & Robb
Robb Attorneys

UNITED STATES PATENT OFFICE.

CHRISTIAN HANSEN, OF CHICAGO, ILLINOIS.

POTATO-PLANTER.

1,015,177. Specification of Letters Patent. Patented Jan. 16, 1912.

Application filed February 25, 1911. Serial No. 610,884.

*To all whom it may concern:*

Be it known that I, CHRISTIAN HANSEN, a citizen of the United States, residing at Chicago, in the county of Cook and State of Illinois, have invented certain new and useful Improvements in Potato-Planters, of which the following is a specification.

This invention is primarily designed to provide a machine whereby potatoes may be planted without any manual labor and at regular intervals, as will be described in the following detail description.

Another object of this invention is to provide a potato planter which conveys potatoes from the hopper to the seed tube, from which the potato is planted without the unnecessary piercing of the potato by any prongs, such as does the usual type. By constructing the potato planter in accordance with the present invention, the seed potato is planted in the same condition in which it leaves the hopper which is not true when one or more prongs pierce the potato to drop the same into the ground as the prongs may pierce into the eyes and thus render the seed useless.

A further object is the provision of a novel means for releasing the potato at the proper moment, thereby insuring the regular planting of the seeds.

With the above and other objects in view, this invention consists in the construction, combination, and arrangement of parts, all as hereinafter more fully described, claimed, and illustrated in the accompanying drawings, wherein—

Figure 1 is a longitudinal vertical section of a potato planter constructed in accordance with the present invention taken on line 1—1 of Fig. 2, parts thereof being in elevation for the sake of clearness; Fig. 2 is a plan view; Fig. 3 is a detail view of a picker or carrier arm by which the potatoes are conveyed from the hopper to the seed tube or spout for the planting of the same; Fig. 4 is a detail of the picker or conveyer arm.

Throughout the following description and on the several figures of the drawings, similar parts are referred to by like reference characters.

Referring more particularly to the drawings, 1 indicates the frame which has mounted thereon in any desired manner the wheels 2. Carried on the front of the frame is a plow 3 which opens a furrow in which the potatoes are dropped or planted. The forward cross member of the frame has mounted thereon a pair of brackets by which the potato planting mechanism may be detachably secured to the main frame 1, the rear terminal of said mechanism frame being secured by a bolt, as at 5.

The auxiliary frame 6 which is detachably carried by the main frame 1 and carries the potato planting mechanism comprises longitudinal members on which is mounted a receptacle or hopper 7 in which the seed potatoes are placed ready for planting. Rotatably mounted on the central portion of the auxiliary frame is the hub 8 to which are secured radially extending picker arms or potato conveyers 9 which convey the potatoes from the hopper 7 to the seed spout or tube 10 where the potato is retained by the valve or gate 11 until the same is opened, as will be hereinafter more fully described. Encircling the hub 8 and carried by the picker arms 9 is a rim 12 which has mounted thereon at regular intervals the potato gripping mechanism for gripping or clasping the potato when the same is being carried by the picker or conveyer arm 9. Each picker or conveyer arm comprises an inner portion having mounted thereon a plurality of projections 13 and 13', the projection 13' protruding through apertures formed in the rim 12 for that purpose. These projections pass through a portion of the bottom of the hopper 7 which is formed in such a manner as to receive the same, as illustrated in Fig. 2 of the drawings, whereby a potato or potato cutting is caught by such projections and conveyed to the seed spout 10. A pair of vertical supports or members 14 are secured to the auxiliary frame 6 whereby a guard, such as 15, may be mounted about the conveyer wheel, as will be obvious.

The mechanism whereby the potato is held in a secure position while being conveyed to the seed spout or tube comprises an operating member consisting of a member 16 pivotally mounted on the rim 12 and the U-shaped member 17 rigidly secured to the pivoted member 16, the terminals of said U-shaped member 17 being deflected laterally to form feet or extensions 18. A spring 19 is carried by the hub 8 and is connected with the U-shaped member 17 by the link 20 to give the operating member the tendency to normally lie flat upon the rim 12. A cross piece 21 is carried by the member 16 and has secured thereto the bearing members 22 which form a bearing for the clasping or gripping member 23. A member 24 is pivotally mounted on one arm of the L-shaped gripping member 23 and is slidably connected to the link 20 whereby, upon the forward or outward movement of the operating member 16, the member 24 will limit the clamping movement of the member 23 to prevent bruising the potato by excessive pressure. Each potato clamping member 23 comprises a U-shaped member having the arms thereof bent at right angles to form a bell crank construction, each arm of said member being provided with an off set portion 25 where the said arm is bent at right angles said off set portion forming a journal by which the member 23 is journaled in the bearing members 22, as illustrated in the drawings. A guide member comprising the members 26 and 27 connect the rim 12 to the outer terminal of the picker arm projection 13', the free terminals of said members 26 and 27 being connected by a guard member 28. The projection 13', together with the guide member 26 project through the loop portion of the clamping member 23 whereby the latter is prevented from dislodgment of the guard member 28.

Mounted on each vertical support 14 is a cam 29 which is adapted to be engaged by the lateral extensions or feet of the U-shaped member 17 whereby the potato gripping or clamping mechanism is operated. As these feet 18 ride off the cam 29, the springs 19 draw the operating member 16 downwardly or inwardly whereupon the gripping member 23 strikes against the guide member 27 for throwing said gripping member to the position as shown on the majority of the picker arms illustrated in Fig. 1.

From the foregoing, it will be observed that as the conveyer arm projections pass upwardly through the bottom of the hopper 7, a potato or potato cutting will be caught by the projection 13' between the side projections 13 and carried but a short distance before the lateral extensions or feet 18 engage the cam 29 whereupon the potato is held securely until said feet ride off the cam 29 upon which the gripping mechanism releases the potato and permits the latter to fall into the seed tube 10. The valve or gate 11 is opened and closed automatically, the mechanism for doing the same comprising a pair of vertical standards 40 mounted on the auxiliary frame 6, on which standards is pivotally mounted the arm 30 one terminal of which is secured to the valve 11 by the connecting rod 31 while the other terminal or end of said arm or lever 30 is adapted to project into the path of the conveyer arm or projection 13', which latter trips the lever and thereby opens the gate, as will be obvious from the drawing. To normally retain the valve closed, a spring 32 is provided connecting said valve to the arm 33 carried rigidly on the frame 6.

Mounted on the shaft on which the hub 8 is mounted is a gear 34 which is driven by a chain connection with the gear 35 mounted on the axle on which the wheels 2 are mounted. The clutch mechanism 36 is provided whereby the potato planting mechanism may be rendered operative or inoperative at the will of the operator. Although the chain and gear mechanism for operating the potato planting mechanism is illustrated, it is not the intention to limit the invention to that particular form of driving mechanism as any suitable or desirable mechanism may be used for the same functions.

The drawings illustrate a single row potato planter but it is not the intention to limit the present invention to this construction as the machine may easily be made to plant two or more rows, as will be obvious.

To facilitate planting for the operator, any suitable marker may be pivoted or otherwise mounted on the machine in any conventional manner.

Having thus fully described my invention, what is claimed as new is:—

1. In a potato planter, in combination, a frame, a hopper on said frame, a delivery means, means for conveying potatoes from said hopper for delivery to said first means, said conveying means being provided with an outwardly projecting arm, a member mounted on said conveying means for outward movement, means for retaining a potato on said arm, said last named means being mounted on said member for relative angular movement, and means for independently moving said last named means by and during movement of said member.

2. In a potato planter, in combination, a frame a hopper on said frame, a delivery means, means for conveying potatoes from said hopper for delivery to said first named means, said conveying means being provided with an outwardly projecting arm, a member mounted on said conveying means for outward movement, means for retaining a potato on said arm, said last named means being mounted on said member for relative movement, and means for independently moving said last named means by and during movement of said member.

3. In a potato planter, in combination, a frame, a hopper on said frame, a delivery means, means for conveying potatoes from said hopper for delivery to said first means, said conveying means being provided with an outwardly projecting arm, a member mounted on said conveying means for outward movement, means for retaining a potato on said arm and swingingly supported on said member, and means for independently moving said last named means by and during movement of said member.

4. In a potato planter, in combination, a frame, a hopper on said frame, a delivery means, means for conveying potatoes from said hopper for delivery to said first means, said conveying means being provided with an outwardly projecting arm, a member mounted on said conveying means for outward movement, means for retaining a potato on said arm and swingingly supported on said member, and means carried by said arm for moving said last named means by and during movement of said member.

5. In a potato planter, in combination, a frame, a hopper on said frame, a delivery means, means for conveying potatoes from said hopper for delivery to said first means, said conveying means being provided with an outwardly projecting arm, a member mounted on said conveying means for outward movement, means for retaining a potato on said arm and swingingly supported on said member, means carried by said arm for moving said last named means by and during movement of said member, and means for limiting the movement of said potato retaining means.

In testimony whereof I affix my signature in presence of two witnesses.

CHRISTIAN HANSEN.

Witnesses:
JOHN STEWART,
EDMUND KOCH.

---

Copies of this patent may be obtained for five cents each, by addressing the "Commissioner of Patents, Washington, D. C."